United States Patent [19]
Asano et al.

[11] Patent Number: 6,008,559
[45] Date of Patent: Dec. 28, 1999

[54] MOTOR USING A ROTOR INCLUDING AN INTERIOR PERMANENT MAGNET

[75] Inventors: Yoshinari Asano, Takefu; Masayuki Shinto, Sabae; Hiroshi Ito, Takefu; Takeshi Morishige, Kadoma; Yukio Honda, Katano; Hiroshi Murakami, Suita; Naoyuki Kadoya, Kadoma; Shizuka Yokote, Osaka, all of Japan

[73] Assignee: Matsushita Electric Industrial Co., Ltd., Japan

[21] Appl. No.: 09/120,437

[22] Filed: Jul. 22, 1998

[30] Foreign Application Priority Data

Jul. 22, 1997 [JP] Japan ................................. 9-195379

[51] Int. Cl.[6] .............................. H02K 29/00; H02K 1/10
[52] U.S. Cl. ..................... 310/156; 310/162; 310/261; 310/166
[58] Field of Search ...................... 310/156, 162, 310/261, 166

[56] References Cited

U.S. PATENT DOCUMENTS

| | | | |
|---|---|---|---|
| 4,486,679 | 12/1984 | Jones | 310/218 |
| 4,954,736 | 9/1990 | Kawamoto et al. | 310/156 |
| 5,097,166 | 3/1992 | Mikulic | 310/156 |
| 5,159,220 | 10/1992 | Kliman | 310/156 |
| 5,191,256 | 3/1993 | Reiter et al. | 310/156 |
| 5,811,904 | 9/1998 | Tajima et al. | 310/156 |
| 5,818,139 | 10/1998 | Yamagiwa et al. | 310/156 |

FOREIGN PATENT DOCUMENTS

| | | | |
|---|---|---|---|
| 5-236684 | 9/1993 | Japan | 310/156 |
| 7-107687 | 4/1995 | Japan | 310/156 |
| 8-331823 | 12/1996 | Japan | H02K 29/00 |

*Primary Examiner*—Nestor Ramirez
*Assistant Examiner*—B. Mullins
*Attorney, Agent, or Firm*—Rossi & Associates

[57] ABSTRACT

In a motor having a permanent magnet built in a rotor, a hole for preventing a short-circuit of magnetic flux is disposed so that the hole is adjacent to the outer rim of rotor core, and adjoins to a slit for receiving a permanent magnet as well as the permanent magnet per se. This structure prevents a short-circuit of magnetic flux generated by both ends of the permanent magnet, and the magnetic flux at both ends of the magnet can flow to a stator, thereby contributing to generate torque effectively. As a result, the highly efficient motor with less cogging torque, less vibration and lower noise can be provided.

22 Claims, 13 Drawing Sheets

A: Motor without holes for preventing a short-circuit of magnetic flux
B: Motor in FIG. 12
C: Motor in FIG. 13

MOTOR USING A ROTOR INCLUDING AN INTERIOR PERMANENT MAGNET

FIELD OF THE INVENTION

The present invention relates to a driving motor used in air conditioners and other industrial apparatuses, more particularly, a structure of the motor which employs a rotor core having an interior permanent magnet and utilizes not only magnet torque but also reluctance torque.

BACKGROUND OF THE INVENTION

A high efficiency motor, which can utilize magnet torque as well as reluctance torque by mounting an interior magnet into a rotor core, is well known in the market, one example of which is disclosed in the Japanese Patent Application Unexamined Publication No. H08-331823. FIG. 15 is a cross section illustrating this kind conventional motor.

In FIG. 15, a stator 1 comprises a plurality of teeth 11 and yokes 12 which connects roots of the plural teeth, and the stator 1 is shaped like a ring. A plurality of slots 13 formed between the teeth are wound with a three-phase winding. A rotor 7 is substantially coaxial with the stator 1 and is shaped like a cylinder. The rotor 7 has four rotor poles facing the inner face of stator 1, and is supported by a bearing (not shown) so that the rotor 7 can rotate on a shaft 24. Four slits 72 punched through axially and disposed at an equal interval along a rotational direction of the rotor core 71 are provided on the rotor 7, and a plate-like permanent magnet 73 is inserted into each slit. A terminal plate (not shown) is disposed on each axial end of the rotor core 71 to cover the permanent magnet 73. The terminal plate is fixed on the end face by riveting a pin 26 through a hole 25, whereby the permanent magnet 73 is fixed into the rotor core 71. An outer circle of the rotor 7 has a notch 77 at a boundary area between the rotor poles, and both of longitudinal ends of the permanent magnet 73 are adjacent to the notch 77. An electric current runs through the stator coil to form a rotating magnetic field. Then, the rotor poles attract/repel the teeth 11 of the stator 1, whereby the rotor 7 is rotated.

In the above structure, the following relation is established between inductances Ld and Lq:

$$Ld<Lq$$

where Ld is an inductance along "d" axis which crosses the rotor pole at a right angle, and Lq is an inductance along "q" axis runs through the boundary area between the rotor poles.

In general, motor torque T is expressed by the following equation:

$$T=Pn\{\phi a \cdot I \cdot \cos \beta + 0.5(Lq-Ld)I^2 \cdot \sin 2\beta\} \quad (1)$$

where,

Pn: a number of paired rotor poles, $\phi a$: interlinkage magnetic flux

I: stator coil current

β: leading phase angle of the current I (electrical angle)

In the equation (1), the first term represents magnet torque, and the second represents reluctance torque. Since the relation of Ld<Lq is satisfied, a winding current is so controlled to advance the phase of the winding current I with regard to respective induced voltage generated in each phase winding, thereby β becomes greater than zero (β>0), and the reluctance torque is generated. When β is set at a predetermined value, the greater torque T can be produced with a same current than the case where only the magnet torque is available.

However, according to the above structure, since a steel portion 78 having a high permeability exists between the slit 72 and the notch 77, magnetic flux at the longitudinal end of the permanent magnet 73 runs through Pa (magnetic path of the steel portion 78) and is short-circuited as shown in FIG. 15, although it would be expected to reach the stator 1 and contribute to generate the torque. In other words, the magnetic flux decreases by the short-circuited amount, thereby lowering a motor efficiency. Further, the magnetic flux resulted from short-circuited increases cogging torque, which makes a motor noisy and vibrational.

SUMMARY OF THE INVENTION

The present invention aims to provide a high efficient motor with less vibration and noise.

In order to address the above problems, a motor according to the present invention has the following structure: A slit for receiving a permanent magnet is punched on a rotor core so that the slit is adjacent to an outer circumference of the rotor core. An adjoining hole to a longitudinal end of the permanent magnet is provided on the rotor core so that the hole is also adjacent to the outer circumference of the rotor core. This hole prevents magnetic flux from being short-circuited. The permanent magnet is inserted into the slit.

The above structure prevents the magnetic flux generated from both ends of the permanent magnet from being short-circuited, thus the magnetic flux flows to a stator, and contributes to generate torque. As a result, this structure can realize a highly efficient motor having the lower cogging torque and noise as well as the less vibration.

The motor according to the present invention has another structure as follows: The slit for receiving the permanent magnet is punched on the rotor core so that the slit is adjacent to the outer circumference of the rotor core. The adjoining hole to a longitudinal end of the permanent magnet is provided on the rotor core so that the hole is also adjacent to the outer circumference of the rotor core. The hole prevents magnetic flux from being short-circuited. The stator shaped like a ring has a plurality of teeth. The permanent magnet is inserted into the slit provided on the rotor core of the rotor.

The above structure prevents the magnetic flux generated from both ends of the permanent magnet from being short-circuited, thus the magnetic flux flows to the stator, and contributes to generate torque. As a result, this structure can realize a highly efficient motor having the lower cogging torque and noise as well as the less vibration.

It is preferable that the rotor has the following structure: Assume an angle covering one of the rotor core portions adjacent to the circumference of the rotor is "θ a", where the rotor core portion represents the following area: from one of the holes for preventing a short-circuit of magnetic flux of the permanent magnet of one rotor pole, the hole adjoining to the slit as well as the permanent magnet in the slit, to another hole for preventing a short-circuit of magnetic flux of the permanent magnet in another slit of another rotor pole adjacent to the above rotor pole, this another hole is located at the first end of this another slit and, at the same time, located at the nearer place to the above hole than the other hole located at the second end of this another slit. Assume a number of rotor poles is Nm, and make the rotor core portion angle "θ a" substantially equal to 120/Nm degree, then the magnetic flux from the permanent magnet can be utilized with high efficiency, and the cogging torque as well as torque ripple can be reduced. As a result, less vibration and low noise of the motor can be achieved.

DESCRIPTION OF THE PREFERRED EMBODIMENTS

Figure 1:
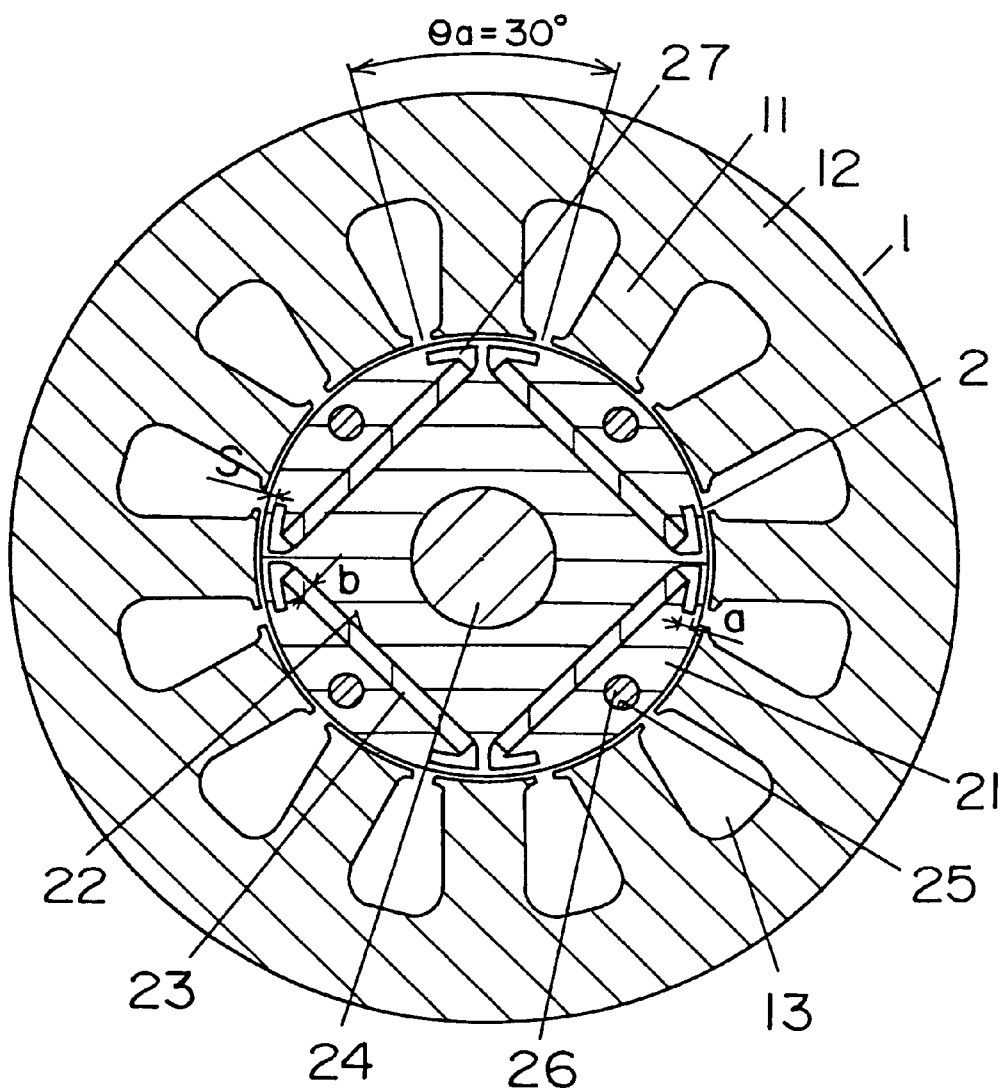
FIG. 1 is a cross section of a motor used in a first exemplary embodiment of the present invention.

The exemplary embodiments of the present invention are described by referring to the drawings attached.
(Embodiment 1)

FIG. 1 is a cross section depicting a motor used in this first exemplary embodiment.

A stator 1 comprises 12 blades of teeth 11 and yokes 12 coupling roots of the teeth 11, and the stator 1 is shaped like a ring. Between the teeth 11, twelve slots 13 are formed and wound by three phase coil in a manner of distributed winding such as windings by striding over adjacent three teeth.

A rotor 2 is substantially coaxial with the stator 1 and shaped like a cylinder. The rotor 2 has four rotor poles facing an inner face of the stator 1, and is supported by a bearing (not shown) so that the rotor 2 can rotate on a shaft 24. In the rotor 2, a plate type permanent magnet 23 is inserted in four slits 22 which are punched axially along the shaft 24 and disposed at an equal interval therebetween along a rotating direction of a rotor core 21. A terminal plate (not shown) is disposed on each axial end of the rotor 2 and is riveted with a pin 26 using a through hole 25 so that the permanent magnet 23 is fixed in the rotor core 21. An electric current runs through the stator coil to form a rotating magnetic field. Then, the rotor poles attract/repel the teeth 11 of the stator 1, whereby the rotor 2 is rotated.

The rotor 2 has a hole 27 for preventing magnetic flux from being short-circuited, the hole 27 is adjacent to the outer circumference of the rotor core 21 and adjoins the slit 22 as well as each end of the permanent magnet 23.

Figure 15:
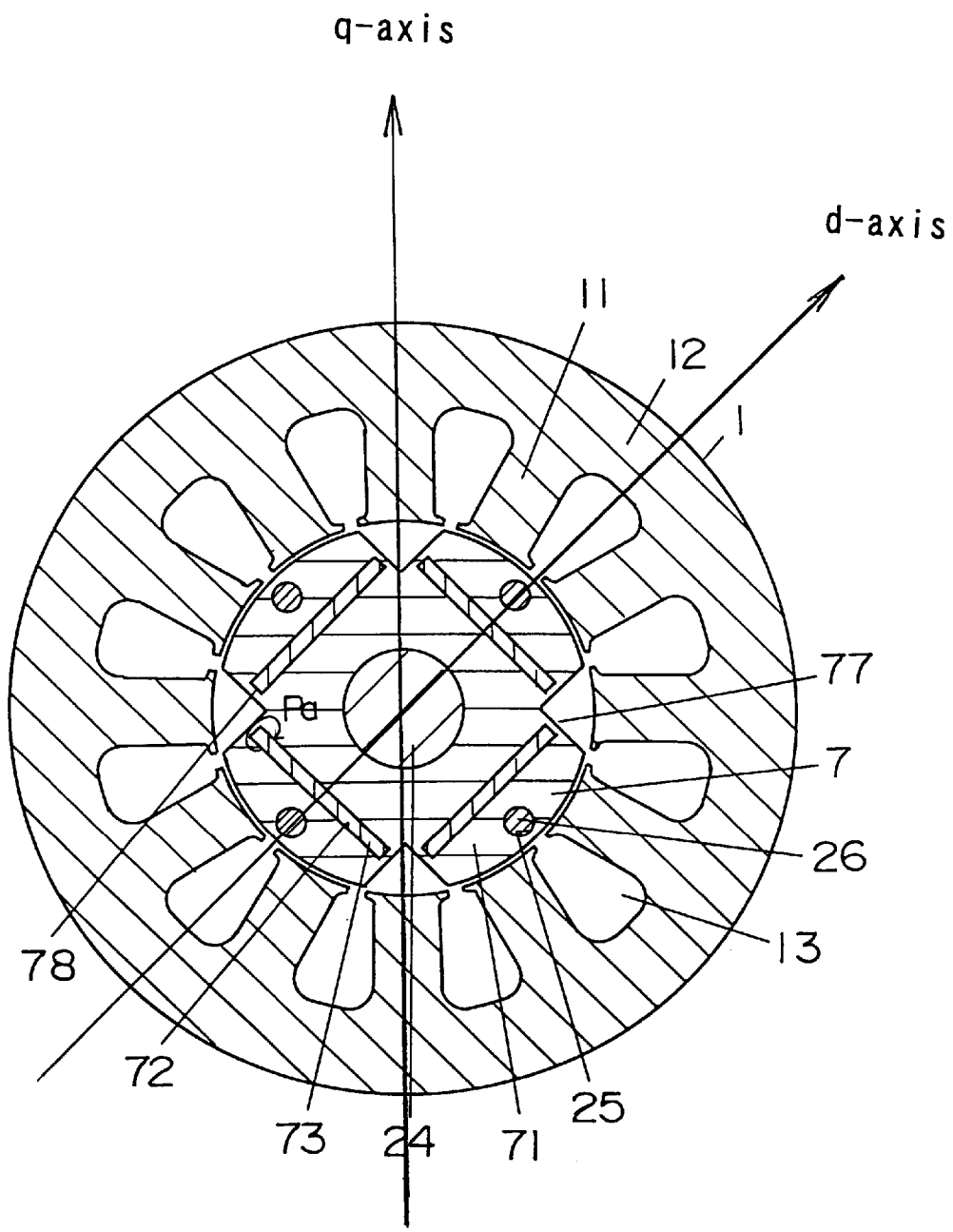
FIG. 15 is a cross section depicting a conventional motor.

The above structure prevents the magnetic flux generated by both ends of the permanent magnet 23 from being short-circuited as it occurred in the prior art shown in FIG. 15, because of the presence of the hole 27, thus the magnetic flux flows to a stator 1, and contributes to generate torque. As a result, this structure can realize a highly efficient motor having low cogging torque and low noise as well as less vibration.

The hole 27 is disposed inside the outer circumference of the rotor core 21, whereby a steel-made narrow area as a part of rotor core is remained between the hole 27 and the outer circumference of the rotor core 21.

A clearance S between the hole 27 and the outer circumference of the rotor core 21 is preferably narrow from the magnetic standpoint, on the other hand, is preferably wide from the strength view of point. In general, the clearance S should be the same distance as an air gap or less, and 80% or more than a thickness of a laminated steel plate forming the rotor core 21.

A width "a" of the hole 27 along the radial direction of the rotor core is preferably wide enough comparing an air gap between the teeth 11 and the corresponding part of rotor 2. In general, the width "a" should be twice the air gap width or more.

An angle formed by an edge width of the hole 27 adjacent to the outer circumference of the rotor core with regard to the rotor core center is narrower than an angle formed by the magnet's longitudinal length facing the outer circumference of the rotor core with regard to the rotor core center.

In other words, a length of the edge width of the hole 27 facing to the outer circumference of the rotor core should be small enough so as not to block the magnetic flux from the end of permanent magnet 23 to flow to the stator 1, whereby the magnetic flux generated by the end of the permanent magnet 23 is not short-circuited around the magnet end but is ensured to flow to the stator 1 and is able to contribute to generate the torque.

The permanent magnet 23 inserted in the slit 22 is shaped in a flat plate, and thus the magnet 23 can be manufactured with ease and at a low cost. Further, due to a flat plate shape, a dimensional accuracy of the magnet 23 can be obtained, and therefore, a gap between the slit 22 and the magnet 23 can be narrowed, which reduces magnetic resistance between the magnet 23 and the rotor core 21. As a result, a highly efficient motor is realized.

When the permanent magnet 23 in the slit 22 employs rare earth magnet, the motor can be downsized, for the rare earth magnet generates a higher density magnetic flux than a ferrite magnet does in a motor having the same power. Thus, a motor employing the rare earth magnet can generate the same efficiency with half dimensions. Further, because the rare earth magnet has high coercive force, a thickness thereof can be reduced. However, reducing the thickness of magnet in the conventional rotor structure has generated numbers of the short-circuits of magnetic flux around both longitudinal ends of the magnet. The hole 27, therefore, is an effective preventive measure against the short-circuit of magnetic flux.

Thanks to the above structure, an efficiency at each load point increases by 1–3%.

In the rotor 2, a number of slits 22 equals to Nm, i.e., a number of rotor poles, and when the rotor core's radius is "r", an end thickness of the magnet 23 can be less than πr/3 Nm. In this first exemplary embodiment, the number of slit 22 is four, that equals to the number of rotor poles, therefore, when the rotor core's radius is "r", the end thickness of the magnet 23 can be less than πr/12.

In the rotor 2, assume an angle covering one of the rotor core portions is "θ a", where the rotor core portion represents the following area: from one of the holes 27 for preventing a short-circuit of magnetic flux of the permanent magnet 23 of one rotor pole, the hole 27 adjoining to the slit 22 as well as the permanent magnet 23 in the slit 22, to another hole 27 for preventing a short-circuit of magnetic flux of the permanent magnet 23 inserted in another slit 22 of another rotor pole adjacent to the above rotor pole, this another hole located at the first end of the slit and, at the same time, located at nearer place to the above hole than the other hole located at the second end of this another slit. The rotor core portion angle "θ a" is set at substantially equal to 120/Nm degree, i.e., in this first exemplary embodiment, the number of rotor poles Nm=4, and the angle "θ a" is set at 30° along the rotating angle. A tolerance of the angle "θ a" is desirable to be less than "S" i.e., the clearance between the hole 27 and the outer circumference of the rotor.

Figure 5:
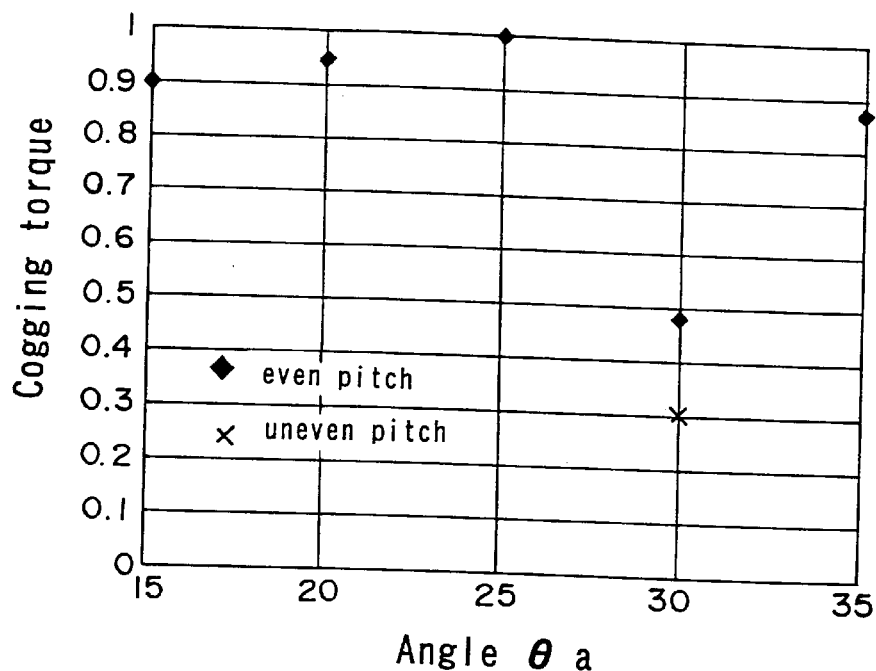
FIG. 5 shows relational characteristics between the angle "θ a" in the rotor core and the cogging torque.

The reason for the above is as follows: FIG. 5 shows relational characteristics between the angle "θ a" of FIG. 1 and the cogging torque which is normalized as the maximum value is represented by "1". When the angle "θ a" stands at 30°, the cogging torque is minimized, and the lowest cogging value is as half as in other angles.

Figure 6:
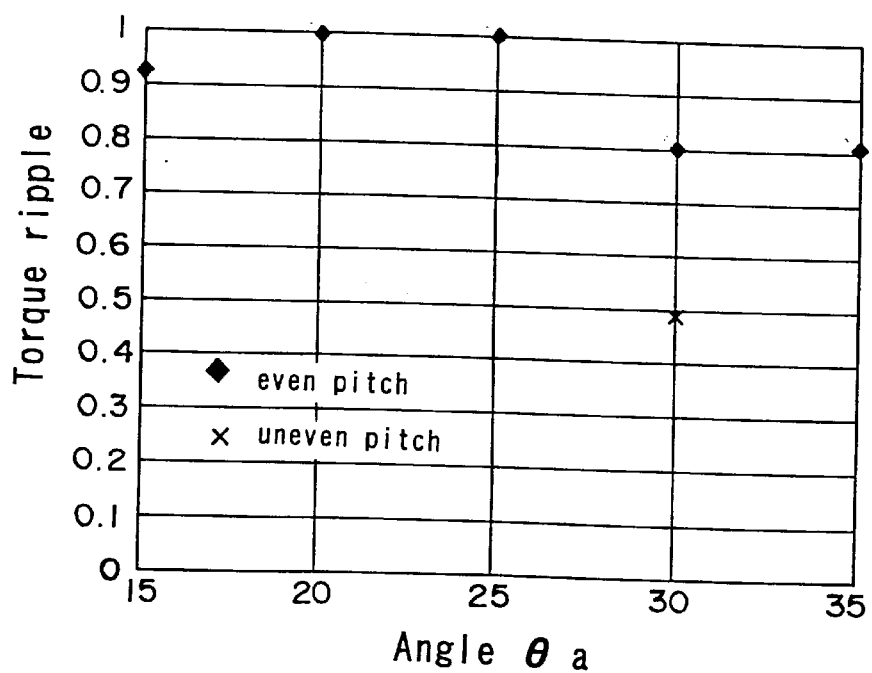
FIG. 6 shows relational characteristics between the angle "θ a" in the rotor core and the torque ripple value.

FIG. 6 shows relational characteristics between the angle "θ a" and the torque ripple value at an actual operation normalized as the maximum value is represented by "1". The torque ripple shows the lowest value at "θ a"=30°, and the next to the lowest is at "θ a"=35°.

It can be concluded that when the angle "θ a" equals 30°, the cogging torque as well as torque ripple is minimized at the lowest point, and the motor works in the most excellent condition from the noise and vibration standpoints.

A non magnetic material can be provided to all of the holes 27 or a part of them, which increases the strength of the rotor core 21.

To be more specific, a non-magnetic material, e.g., brass or aluminum, is provided in all the holes 27 or a part of them as a spacer, or is put into the hole and solidified, whereby the permanent magnet in the slit 22 is not vibrated due to transportation or its own operation. This results in strengthening the rotor and contributing to increase the reliability. When aluminum is flowed into the entire rotor by dicast method, the terminal plate and rivet pins can be casted in one body.

The permanent magnet 23 can be molded in a space limited by the non-magnetic material within the slit 22, i.e., the hole 27 has been provided with a heat-proof non-magnetic material, e.g., brass, and then, for example, a resin magnet is molded to be the permanent magnet 23 in the space limited by the non-magnetic element within the rotor core 21, as a result, a magnetic pole side of the permanent magnet 23 closely contacts with the rotor core 21. The reliability of the rotor thus increases, and further, the magnetic resistance lowers, thereby heightening the motor efficiency. In this case, the non-magnetic material can be tapered, and pulled out from the rotor after the magnet 23 is molded, which prevents a motor loss resulted from an eddy current generated within the non-magnetic material.

Figure 2:
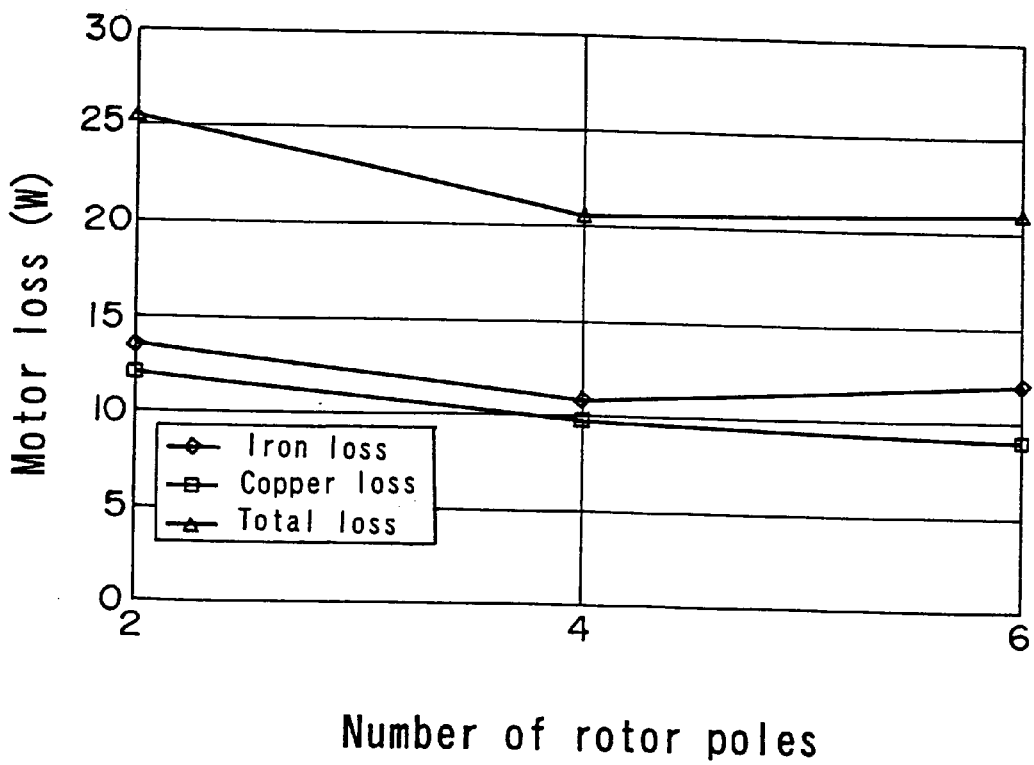
FIG. 2 shows relational characteristics between a number of rotor poles and motor loss when both of a rotor outer diameter and a stator inner diameter are designed optimally responsive to a number of the rotor poles, and the same amount of the permanent magnet is always used.

FIG. 2 shows relational characteristics between a number of rotor poles and motor loss when both of a rotor outer diameter and a stator inner diameter are designed optimally responsive to a number of the rotor poles, and the same amount of the permanent magnet is always used in this first exemplary embodiment. The magnetic flux from one pole decreases at the greater number of rotor poles. The less magnetic flux thus flows to the stator 1, which results in the less magnetic flux flows to the teeth 11, and thus the less magnetic flux runs through the section of the yoke 12. Through this process, the thickness of yoke 12 can be reduced.

As a result, the stator inner diameter as well as the rotor outer diameter can be increased when the stator outer diameter is kept the same. Because the torque is proportional to the rotor outer diameter, the same torque can be produced by the less ampere turns (electric current×number of stator winding's turn), thereby reducing copper loss.

In other words, the copper loss decreases at the greater number of rotor poles. On the other hand, since the higher frequency results in the greater iron loss, a greater number of rotor poles heightens the frequency of phase change, and thereby incurring the greater iron loss.

When the rotor has two poles, if the same rotor outer diameter and the same magnet volume are maintained, then the magnetic flux per one pole increases, which results in generating magnetic saturation at teeth 11 and yokes 12, and thus the iron loss increases.

The motor loss is a total of the iron loss and copper loss, and as shown in FIG. 2, the motor loss is minimized when the rotor has four poles. In the structure of this first exemplary embodiment, the motor efficiency is maximized when the rotor has four poles. Further, when the rotor has four poles and the stator has 12 slots, each phase of the three-phase coil can be wound in a distributed winding manner such as windings by striding over three adjacent teeth, thereby utilizing the rotor magnetic flux effectively. As a result, the motor of high efficiency can be realized.

Figure 3:
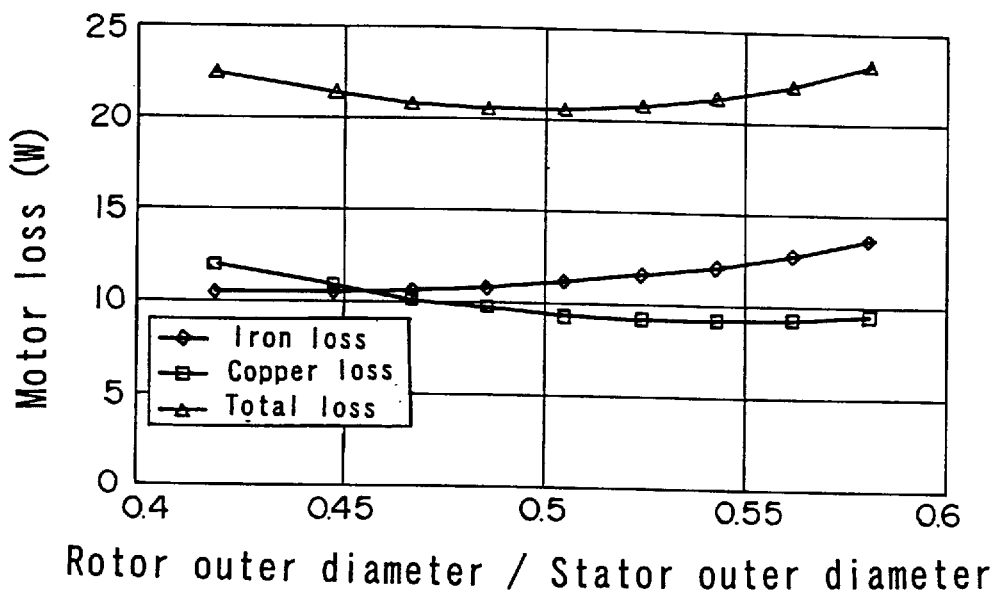
FIG. 3 shows relational characteristics between a ratio of rotor outer diameter vs. stator outer diameter and motor loss when a rotor core employs a steel plate containing a greater amount of silicon.

FIG. 3 shows relational characteristics between a ratio of rotor outer diameter vs. stator outer diameter and motor loss when a rotor core 21 employs a 0.35 mm thickness laminated steel plate containing substantially 3% of silicon.

Figure 4:
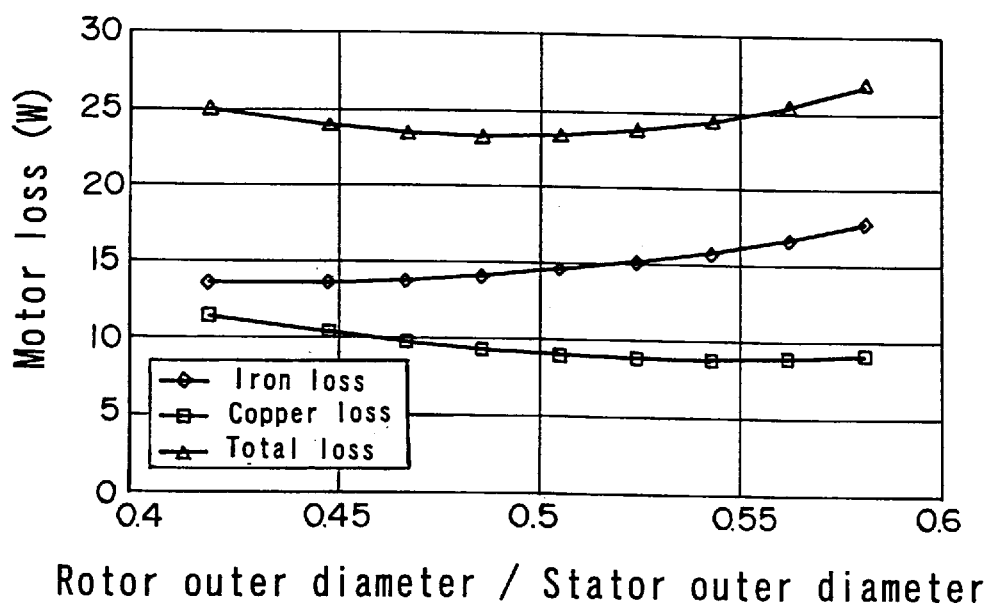
FIG. 4 shows relational characteristics between a ratio of rotor outer diameter vs. stator outer diameter and motor loss when a rotor core employs a steel plate containing a less amount of silicon.

FIG. 4 shows relational characteristics between a ratio of rotor outer diameter vs. stator outer diameter and motor loss when a rotor core 21 employs a 0.5 mm thickness laminated steel plate containing less then 1% of silicon.

As shown in FIGS. 3 and 4, when the ratio of the rotor outer diameter vs. the stator outer diameter increases, the copper loss decreases and the iron loss increases. Both of FIGS. 3 and 4 depict that the motor loss is minimized when the ratio stays between 0.47 and 0.5. Therefore, this first exemplary embodiment proves that the motor works at the highest efficiency when the ratio of the rotor outer diameter vs. the stator outer diameter stays between 0.47 and 0.5.

(Embodiment 2)

Figure 7:
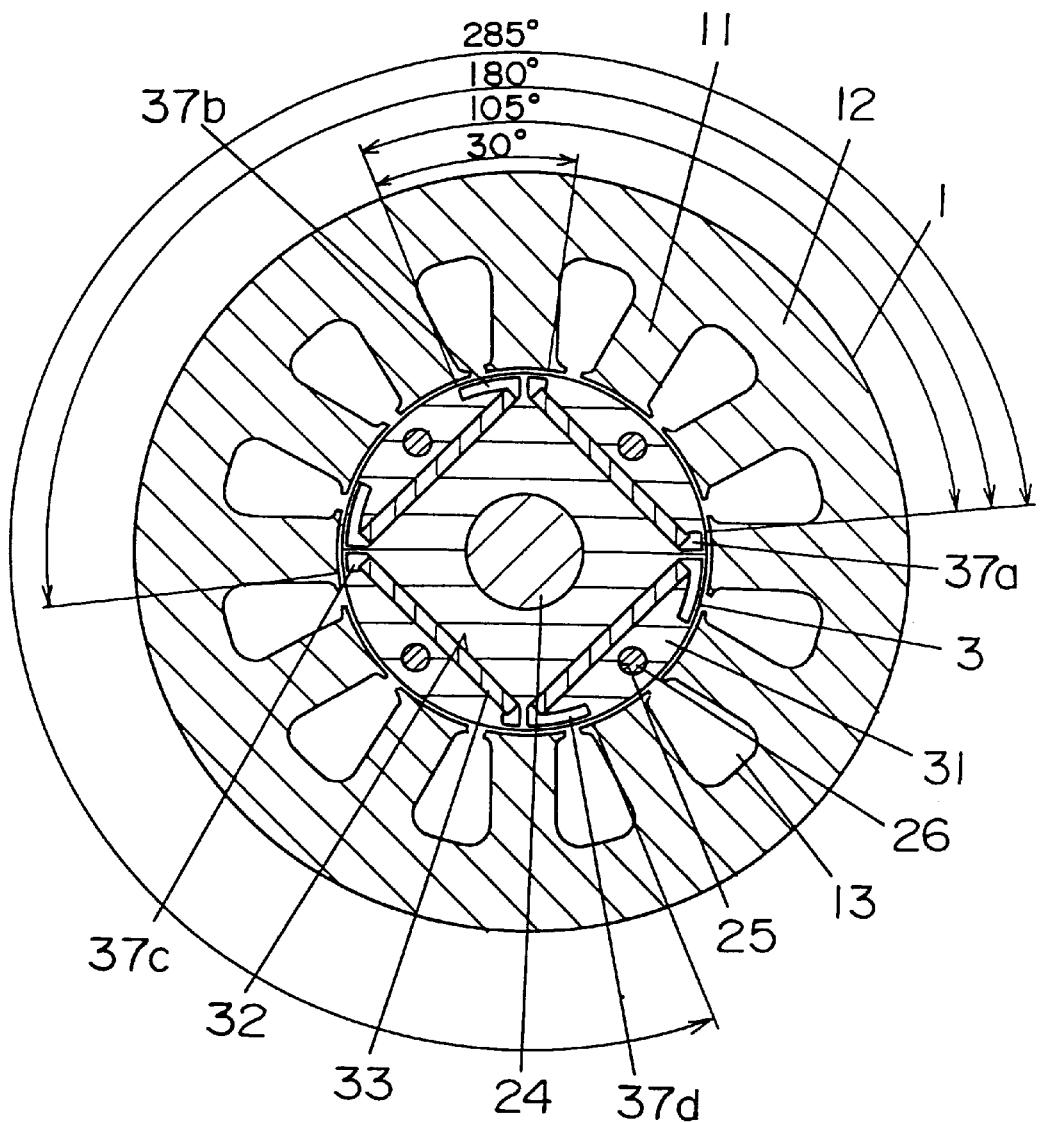
FIG. 7 is a cross section depicting a motor used in a second exemplary embodiment.

FIG. 7 is a cross section of a motor used in the second exemplary embodiment.

Assume an angle "θ i" covers from an end of a hole of a rotor pole for preventing magnetic flux from being shirt-circuited to the corresponding hole of "i"th rotor pole counted "i"th ("i" is a natural number and less than Nm, the number of rotor poles) from the above rotor pole along clockwise or anti-clockwise direction, and then the angle" θ i" is expressed with the following equation:

$$\theta i = 360 \cdot i/Nm + 720 \cdot j/(Nt \cdot Nm) \qquad (2)$$

where

Nm represents a number of rotor poles,

Nt represents a number of stator teeth,

"i" is a natural number and less than Nm,

When "i" divided by Nm/2 results in an integer, then "j" becomes "0" (zero). when the result does not become an interger, and if each decimal part of "i" divided by Nm/2 are the same, then "j" becomes less than Nm/2 and an identical integer.

In the second exemplary embodiment shown in FIG. 7, the number of rotor poles Nm is 4, and the number of stator teeth Nt is 12, then these numbers are put in the equation (2), and "i" and "j" result in as follows:

TABLE 1

"i" can be 1, 2, 3 (Nm = 4, thus it should be less than 4)
"j" can be 0, 1 (0 or a natural number less than Nm/2 = 2)

| i | i/(Nm/2) | j |
|---|----------|---|
| 1 | 0.5 | 1 |
| 2 | 1 | 0 |
| 3 | 1.5 | 1 |

In FIG. 7, an angle "θ1" covering from the end of hole 37a to the end of hole 37b is 105° when "i"=1 and "j"=1 are substituted into the above equation (2). The angle "θ 2" covering from the end of hole 37a to the end of hole 37c is 180° when "i"=2 and "j"=0 are substituted into the above equation (2). The angle "θ 3" covering from the end of hole 37a to the end of hole 37d is 285° when "i"=3 and "j"=1 are substituted into the above equation (2).

According to the above structure, there are two magnetic locational relations between the rotor poles and the stator teeth, and these relations are point symmetric with regard to the rotor center, whereby attraction and repulsion along the radius direction can be evened.

When the rotor has four poles in the above structure, there are two magnetic locational relations between the poles and the teeth. The locational relation between them with approx. 90° deviation is different from that of 180° deviation; however, the locational relation with approx. 180° deviation is identical. Therefore, the force works along the radius direction is cancelled by the teeth deviated at 180° with each other, and thus the attraction and repulsion along the radius direction can be evened. As a result, cogging torque is reduced, and the motor with less vibration and lower noise can be provided.

The cogging torque, in general, varies by Nc per one rotor rotation, where Nc is the least common multiple of Nm and Nt. In other words, one change occurs in 360/Nc degree. Accordingly, when Nt is 3 Nm, one change occurs in 120/Nm degree. In the second exemplary embodiment, there are provided two types of locational relation between the end of the hole for preventing short-circuit and the end of tooth, thereby the change occurs once in 60/Nm dgree, and thus the number of changes in cogging torque can be 6 Nm per one rotor rotation.

In FIG. 5, assume an angle covering one of the rotor core portions adjacent to the outer circumference of the rotor is "θ a", where the rotor core portion represents the following area: from one of the holes for preventing a short-circuit of magnetic flux of the permanent magnet of one rotor pole, the hole adjoining to the slit as well as the permanent magnet inserted in the slit, to another hole for preventing a short-circuit of magnetic flux of the permanent magnet inserted in another slit of another rotor pole adjacent to the above rotor pole, this another hole is located at the first end of this another slit and, at the same time, located at the nearer place to the above hole than the other hole located at the second end of this another slit. When the angle "θ a" is 30° along the same rotating direction as that of the first exemplary embodiment, the cogging torque is lower in the second exemplary embodiment which employs an uneven pitch than in the first one which employs an even pitch, and the waveform frequency is as twice as that in the first one. To be more specific, the cogging torque in the first exemplary embodiment varies 12 times per one rotation, while it varies 24 times per one rotation, thus the cogging torque is smoothed and lowered.

In FIG. 6, when the angle "θ a" is 30° with the same rotating direction as that of in the first exemplary embodiment, the torque ripple in the second exemplary embodiment which employs uneven pitches is lower than that of the first exemplary embodiment which employs the even pitch.

The second exemplary embodiment proves that the motor described above has less cogging torque as well as torque ripple than the motor described in the first exemplary embodiment. It can be concluded that the motor according to the second exemplary embodiment is better than the first one from the vibration and noise view of points.

(Embodiment 3)

Figure 8:
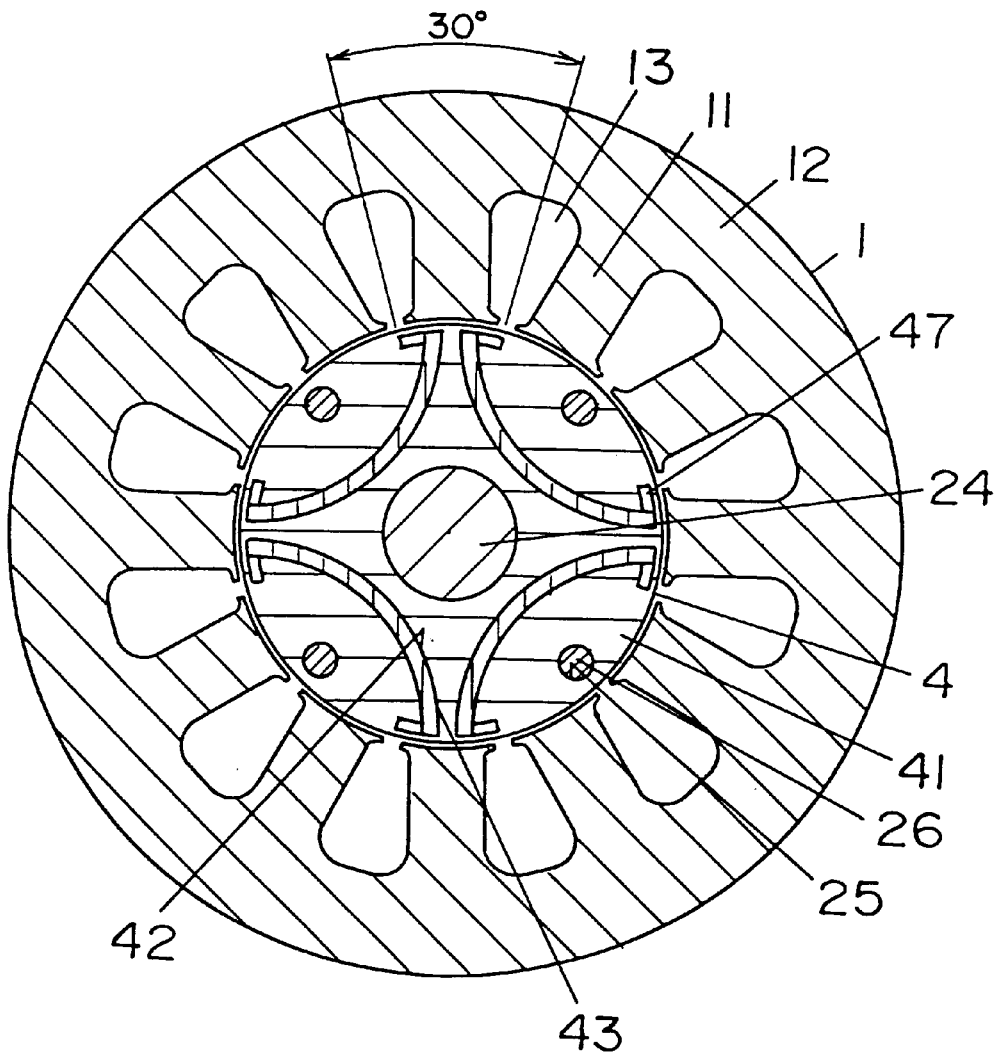
FIG. 8 is a cross section depicting a motor used in a third exemplary embodiment.

FIG. 8 is a cross section of a motor utilized in a third exemplary embodiment.

A slit 42 for receiving a permanent magnet 43 shapes in an arc and concave to a rotor outer circumference. The permanent magnet 43 is inserted into the slit 42.

According to the above structure, a surface area of the permanent magnet 43 can be greater than that of the first exemplary embodiment, and thus the greater torque can be obtained. In this structure, when the radius of the magnet 43 is equal to that of the rotor or less, the surface area of the magnet 43 exceeds that of one pole of the rotor for a better result. When the magnet 43 has relatively low coercive force, necessary magnetic flux can be ensured using the above structure.

(Embodiment 4)

Figure 9:
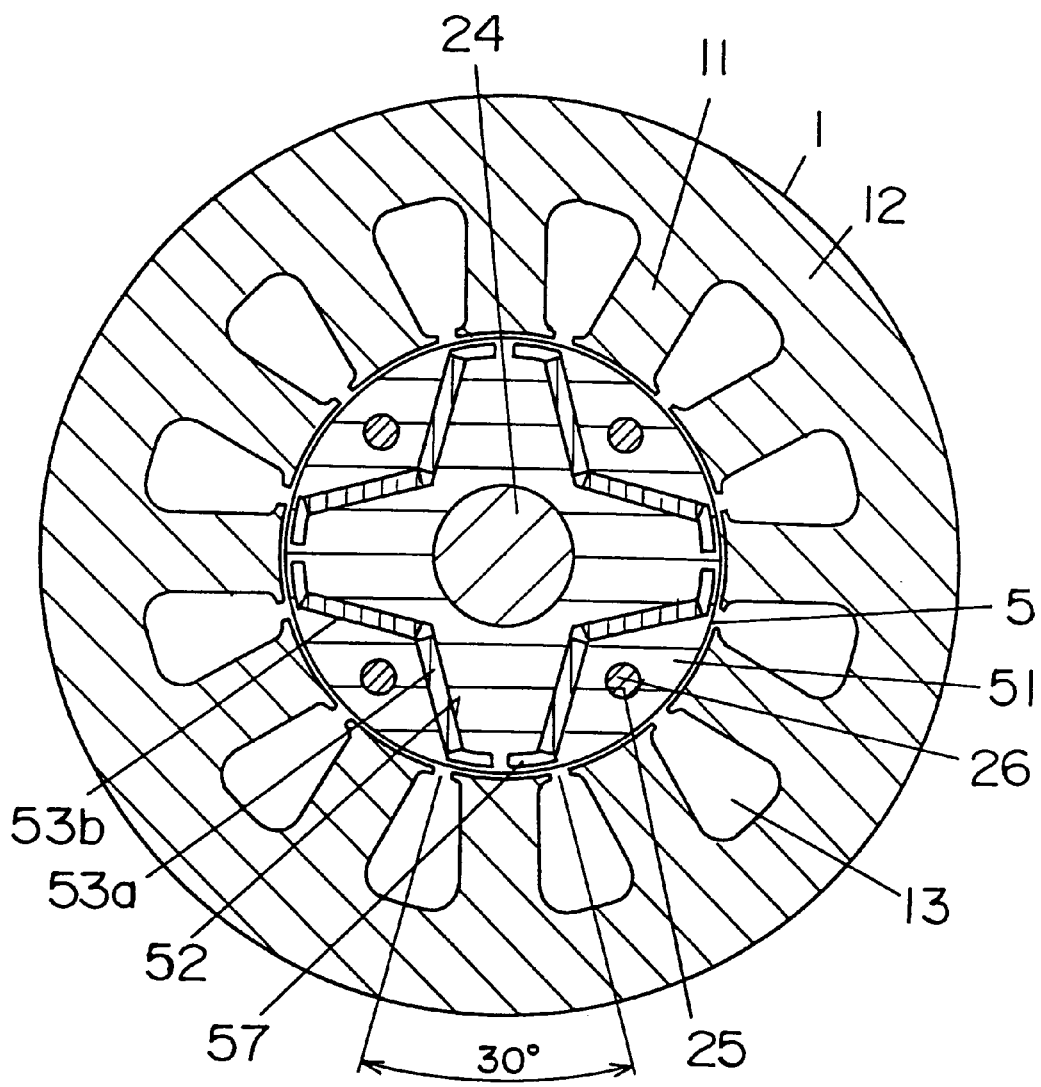
FIG. 9 is a cross section depicting a motor used in a fourth exemplary embodiment.

FIG. 9 is a cross section of a motor utilized in a fourth exemplary embodiment.

A plurality of slits for receiving a permanent magnet are provided so that the slits form a "V" shape to a rotor outer circumference (a grooved side faces to the outer rim.) A plurality of permanent magnets are inserted into the slits.

To be more specific, a slit 52 receives two plates of permanent magnet 53a and 53b. Since each of the two magnets shapes in a flat plate, the magnet can be manufactured with ease and at an inexpensive cost. Further, due to a flat plate shape, a dimensional accuracy of the magnet 53a and 53b can be obtained, and therefore, a gap between the slit 52 and the permanent magnet can be narrowed, which reduces magnetic resistance between the magnets 53a and 53b and the rotor core 51. As a result, a highly efficient motor is realized. Further, the surface area of the magnets 53a and 53b as same as that in the third exemplary embodiment shown in FIG. 8, can be greater than the first exemplary embodiment shown in FIG. 1, whereby greater torque can be obtained than the first exemplary embodiment.

(Embodiment 5)

Figure 10:
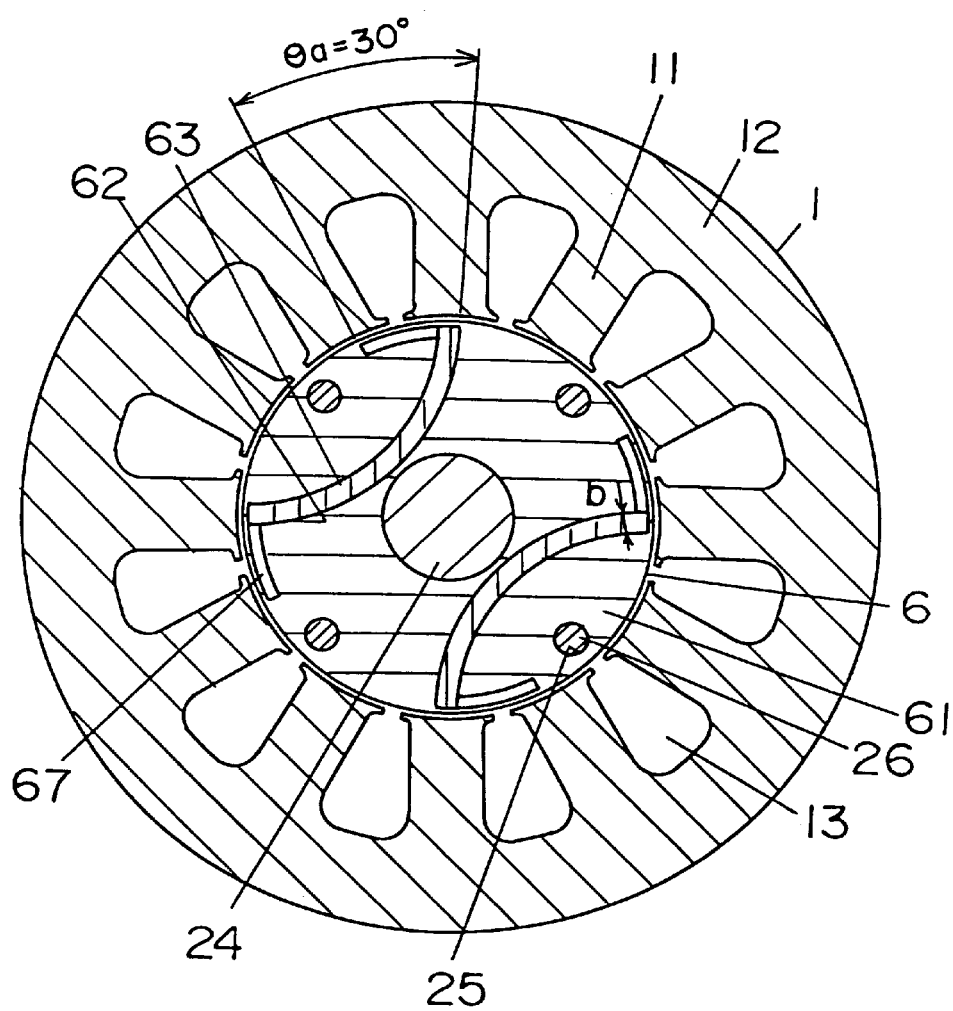
FIG. 10 is a cross section depicting a motor used in a fifth exemplary embodiment.

FIG. 10 is a cross section of a motor used in a fifth exemplary embodiment.

On a rotor 6, a concave slit 62 receiving a permanent magnet 63 is disposed so that concave side faces to the rotor outer circumference, thus opposite rotor poles are formed outer and inner sides of the magnet 63. A rotor pole is formed inside of the magnet 63, and an opposite rotor pole is formed outside of the magnet 63, therefore, a number of permanent magnets can be reduced by a half. This reduction is an advantage particularly when a precious rare earth magnet is employed.

In this case, a number of slits 62 (=Nm/2) is half of the number of rotor poles (=Nm), and when a rotor core's radius is "r", a thickness of magnet end "b" can be less than "πr/(3 Nm)".

An angle "θ a" in FIG. 10 covers an area adjacent to the rotor outer circumference including a hole 67 and its adjoining slit 62. The slit adjoins to the end of the permanent magnet 63. The hole 67 prevents magnetic flux from being short-circuited. The angle "θ a" is 30° along the rotating direction.

In the previous cases, the following structure has been discussed: one of the holes for preventing short-circuit of magnetic flux of the permanent magnet of a rotor pole, the hole adjoining to the slit as well as the permanent magnet inserted in the slit, and another hole for preventing a short-circuit of magnetic flux of the permanent magnet in another slit of another rotor pole adjacent to the above rotor pole, this another hole is located at the first end of this another slit and, at the same time, located at the nearer place to the above hole than the other hole located at the second end of this another slit; however, in this fifth exemplary embodiment, the above anther hole located at the nearer place to the hole does not exist. The angle "θ a" used in the present invention includes this case also.

Regarding an operation of the hole 67 for preventing a short-circuit of the magnet 63 is as same as that of the first exemplary embodiment, thus detailed description is omitted here.

Figure 11:
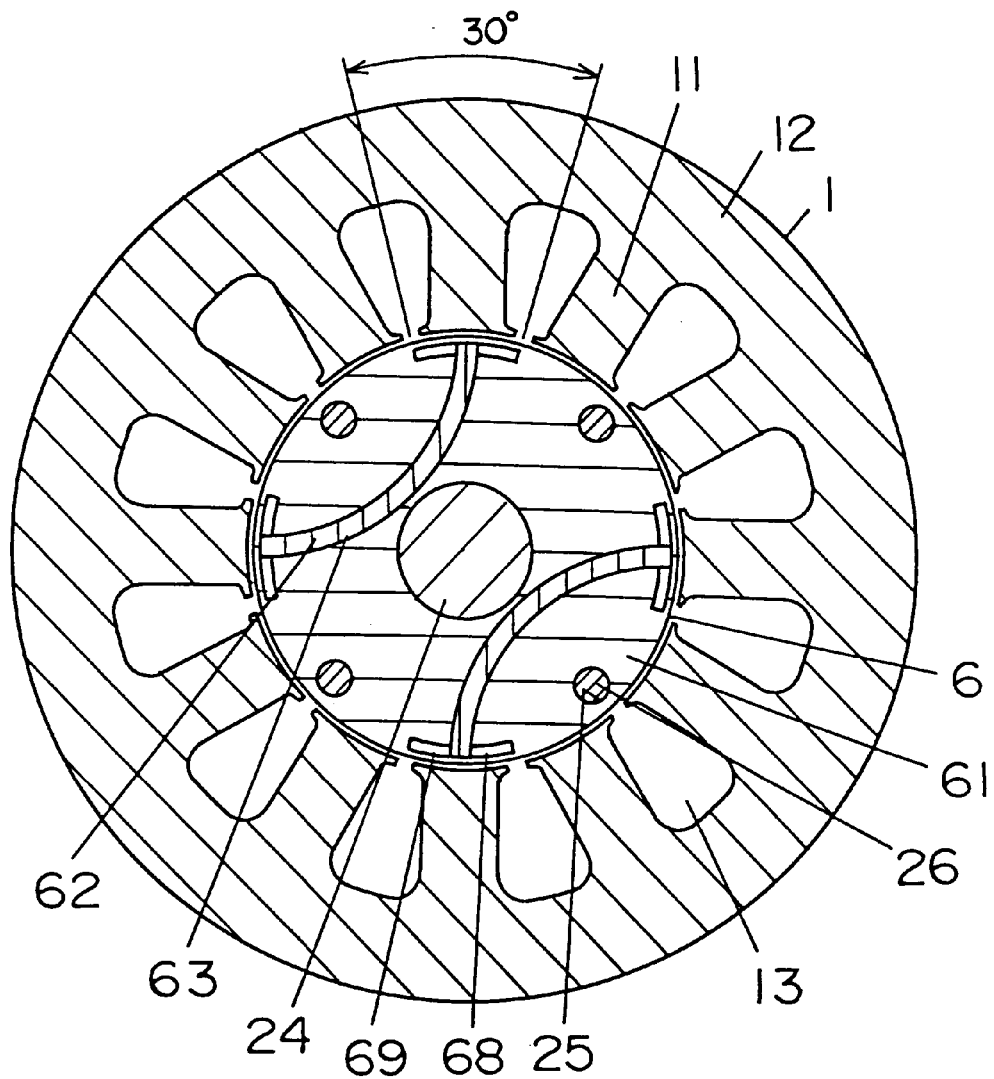
FIG. 11 is a cross section depicting another motor used in a fifth exemplary embodiment.

In FIG. 10, the hole 67 is extended from each end of the magnet 63 to one side and another respectively; however, as shown in FIG. 11, the hole can be extended from each end of the magnet 63 to both sides as holes 68 and 69. This structure is preferable because magnetic flux flows more evenly than that in FIG. 10.

(Embodiment 6)

Figure 12:
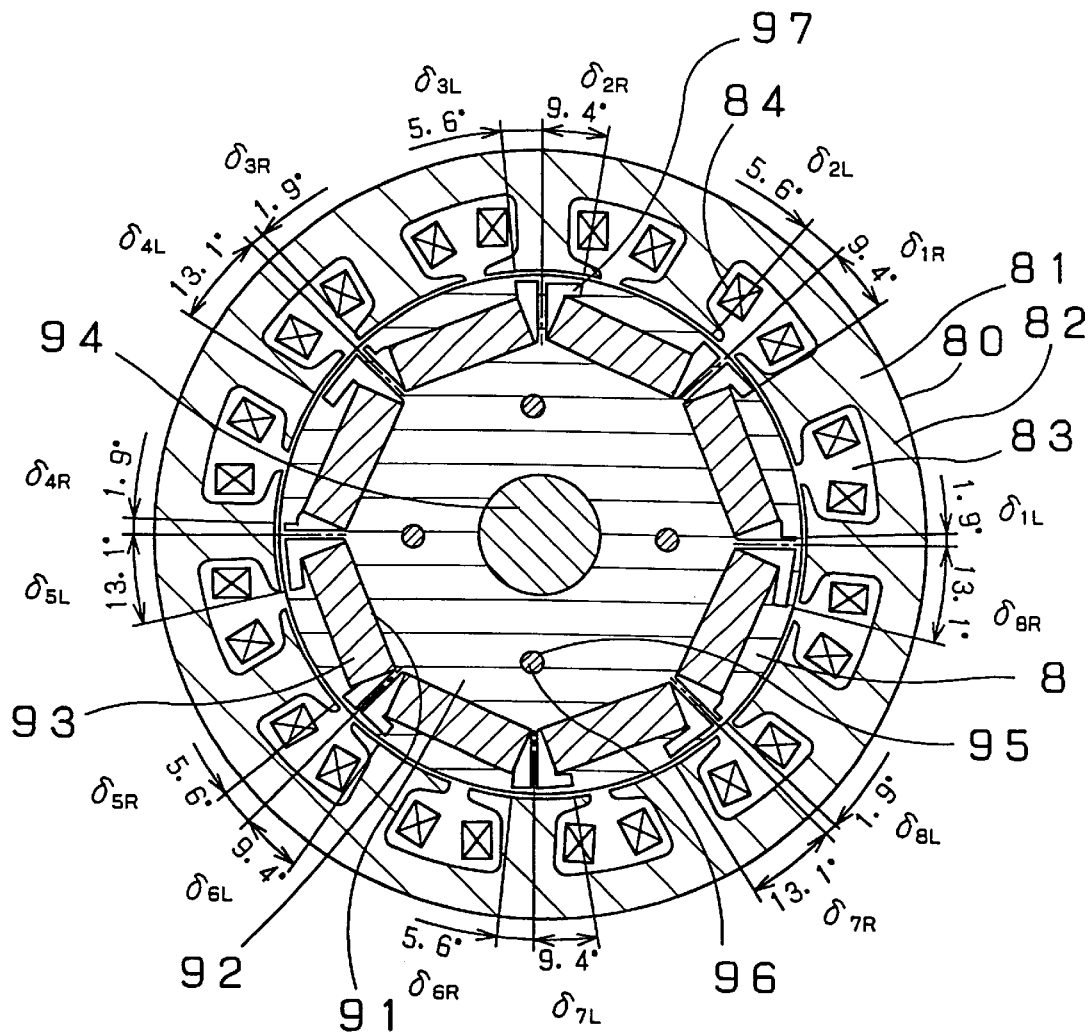
FIG. 12 is a cross section depicting a motor used in a sixth exemplary embodiment.

FIG. 12 is a cross section of a motor used in a sixth exemplary embodiment.

A stator 80 shapes lie a ring and comprises twelve teeth 81 and a yoke 82 which couples each root of the teeth 12. A winding 84 is provided on the respective teeth 12 in a manner of concentrated winding. A rotor 8 is substantially shaped cylindrical and coaxial with the stator 80. The rotor 8 has eight rotor poles facing to inner surface of the stator, and is supported by a bearing (not shown) so that the rotor can rotate on a shaft 94. On the rotor 8, eight slits 92 punched through axially are disposed substantially at the equal interval along a rotating direction of a rotor core 91, and a plate-type permanent magnet 93 is inserted into each slit 92. A terminal plate (not shown) is disposed on each axial end of the rotor core 91, which is fixed by riveting a pin 96 through a punched hole 95, whereby the permanent magnet 93 is fixed in the rotor core 91. An electric current runs through the stator coil 84 to form a rotating magnetic field. Then, the rotor poles attract/repel the teeth 81, whereby the rotor 8 is rotated. A hole 97 for preventing a short-circuit of magnetic flux is provided at each longitudinal end of the slit 92 so that the hole 97 is adjacent to the outer circumference of the rotor. Assume that a rotor core portion has an angle "θ a" where the rotor core portion represents the following area adjacent to the outer circumference of the rotor: from one of the holes 97 for preventing short-circuit of magnetic flux of the permanent magnet of one rotor pole, (the hole adjoining to the slit 92 as well as the permanent magnet 93 inserted in the slit), to another hole for preventing short-circuit of magnetic flux of the permanent magnet in another slit of another rotor pole adjacent to the above rotor pole, this another hole is located at the first end of this another slit and, at the same time, located at the nearer place to the above hole than the other hole located at the second end of this another slit, then the angle "θ a" is approx. 120/Nm, i.e., approx. 15°.

The rotor poles are numbered sequentially from a reference pole clockwise or anti-clockwise direction, such as i=1,2,3,4, , , , , Nm, and at the "i th" pole from the reference pole, an edge width of the hole 97 located at the left end of the pole viewed from outside of the rotor, where the edge is adjacent to the outer circumference of the rotor core, with regard to the rotor core center makes an angle $\delta_{iL}$, and the same angle at right end of the pole is $\delta_{iR}$. Then, between $\delta_{iL}$ and $\delta_{iR}$, there is the following equation:

$$\delta_{iL,R} = \delta_{OL,R} + 240 \cdot n \cdot j / Nm^2 \qquad (3)$$

where,

Nm represents a number of rotor poles,

"n" is an integer between 1 and Nm/2, (both figures are included)

"j" takes an integer between 0 and (Nm/2n)−1 in "n" times respectively for the cases of "i" being an even number, "i" being an odd number, the left end of rotor pole and the right end of rotor pole.

"$\delta_{OL,R}$" is greater than 0 and smaller than 60/Nm and expressed with in the following equation $$\delta_{OL,R} = 120 \cdot n / Nm^2 \qquad (4)$$

where, e.g., n=1 and Nm=8, "j" could be the following values in Table 2 which shows one example of "j", and the corresponding $\delta_{iL}$ as follows:

"i" could be 1, 2, 3, 4, 5, 6, 7, 8

"j" could be 0, 1, 2, and 3 for one each to an odd number of "i", and an even number of "i".

TABLE 2

| I | j | $\delta_{iL}$ (degree) |
|---|---|---|
| 1 | 0 | 1.875 |
| 2 | 1 | 5.625 |
| 3 | 1 | 5.625 |
| 4 | 3 | 13.125 |
| 5 | 3 | 13.125 |
| 6 | 2 | 9.375 |
| 7 | 2 | 9.375 |
| 8 | 0 | 1.875 |

In order to make a width including adjacent holes 120/Nm=15°, the angle $\delta_{iR}$ is determined automatically as shown in Table 3.

| i | j | $\delta_{iR}$ (degree) |
|---|---|---|
| 1 | 2 | 9.375 |
| 2 | 2 | 9.375 |
| 3 | 0 | 1.875 |
| 4 | 0 | 1.875 |

-continued

| i | j | $\delta_{iR}$ (degree) |
|---|---|---|
| 5 | 1 | 5.625 |
| 6 | 1 | 5.625 |
| 7 | 3 | 13.125 |
| 8 | 3 | 13.125 |

In the above Tables 2 and 3, calculated values are shown; however, in FIG. 12, a rounded number to one decimal place is shown due to an accuracy of an angle.

When a number of teeth is (3/2)Nm, a locational relation between the rotor pole and the stator tip is different by 120/Nm degree in an odd numbered rotor pole and in an even numbered rotor pole, and the cogging torque varies 3 Nm times per one rotor rotation. Further, the hole angle with respect to the rotor core center is considered for each of odd numbered rotor poles and even numbered rotor poles, and make the hole angle in Nm/2 ways according to the above equation, then the cogging torque varies (3/2) Nm² times per one rotor rotation, thereby reducing a variation cycle of the cogging torque, and the less cogging torque is realized. As a result, the motor with less vibration and lower noise can be realized.

Figure 13:
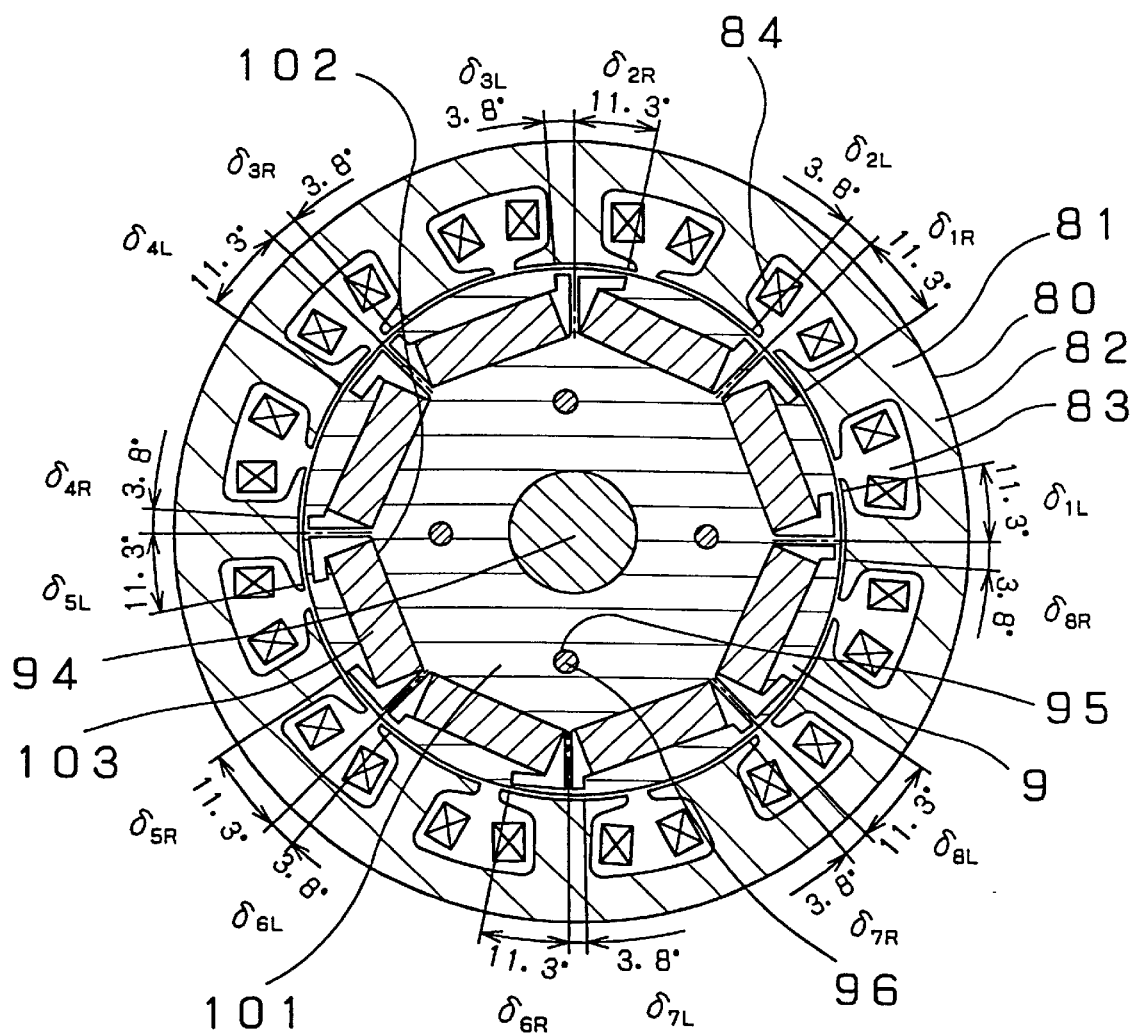
FIG. 13 is a cross section depicting another motor used in a sixth exemplary embodiment.

If the rotor cannot meet the preciseness of dimension and machining, it may be no problem to use n>1 as shown in FIG. 13; however, in this case, less advantages of vibration and noise than those of the motor shown in FIG. 12 are expected. In the case of n=2, some of the possible values which "i" can be are shown in Table 4, and the corresponding $\delta_{iL}$ and $\delta_{iR}$ are also shown.

TABLE 4

| i | j | $\delta_{iL}$ (degree) | j | $\delta_{iR}$ (degree) |
|---|---|---|---|---|
| 1 | 1 | 11.25 | 1 | 11.25 |
| 2 | 0 | 3.75  | 1 | 11.25 |
| 3 | 0 | 3.75  | 0 | 3.75  |
| 4 | 1 | 11.25 | 0 | 3.75  |
| 5 | 1 | 11.25 | 1 | 11.25 |
| 6 | 0 | 3.75  | 1 | 11.25 |
| 7 | 0 | 3.75  | 0 | 3.75  |
| 8 | 1 | 11.25 | 0 | 3.75  |

In the above Tables 4, calculated values are shown; however, in FIG. 13, a rounded number to one decimal place is shown due to an accuracy of an angle.

Figure 14:
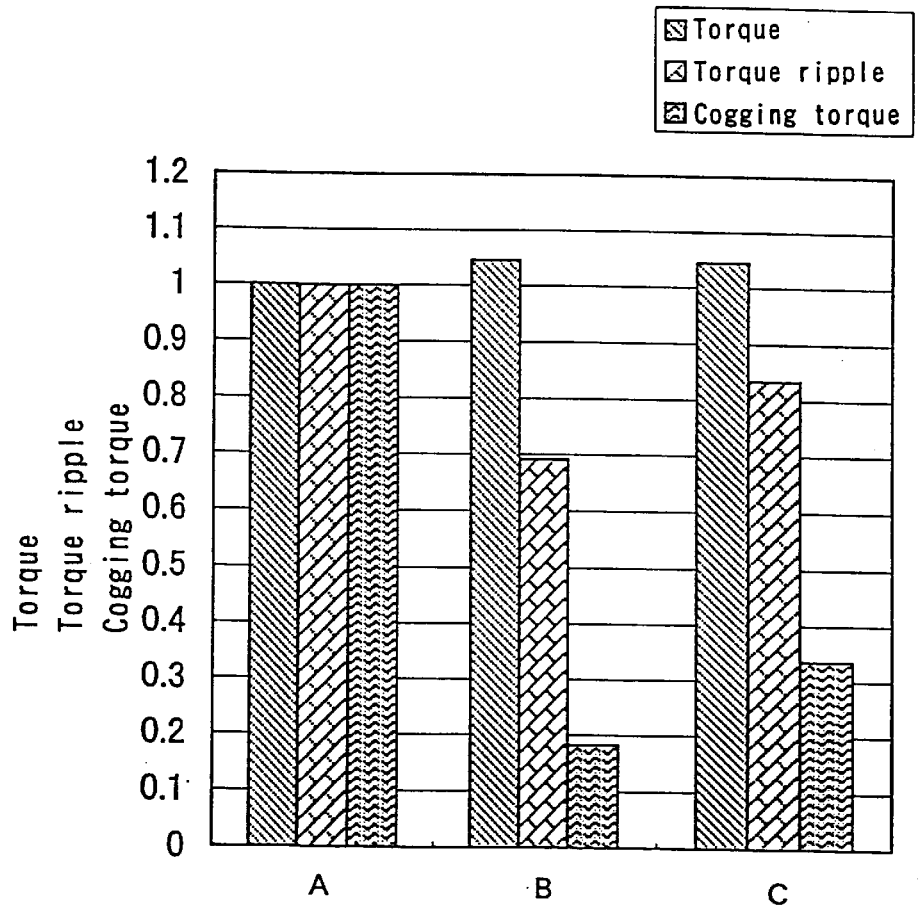
FIG. 14 shows a relational characteristics between each type of motors and torque, torque ripple value as well as cogging torque.

FIG. 14 shows a relational characteristics between each type of motors, (i.e., a motor without holes for preventing a short-circuit of mgnetic flux, the motor shown in FIG. 12 and the motor shown in FIG. 13) and the torque with an identical input power, torque ripple value in an actual operation and cogging torque without being powered. Every value is normalized as each value of the motor without a hole is "1". As shown in FIG. 14, the motor used in the sixth exemplary embodiment proves the torque ripple decreases by 20–30% and the cogging torque by 70–80%. Further, increasing a frequency of excitation can isolate vibration and sound with ease.

The angle specified above has a tolerance of ±5%, which does not affect the characteristics.

The permanent magnet inserted in the slit of the present invention can be not only a solid type but also a mold type, such as a resin magnet which is formed in the slit by molding.

The present invention is not limited to the above exemplary embodiments. Rather, various modifications may be made in the details within the scope and range of the claims and without departing from the spirit of the invention.

What is claimed is:

1. A motor comprising:
   a rotor including a rotor core having at least one slit;
   an annular shaped stator including a plurality of teeth; and
   a permanent magnet inserted in the slit of the rotor;
   wherein said rotor includes at least one hole, located adjacent to an outer circumference of the rotor core and adjoining an end of said slit at which an end of said permanent magnet is located, that extends along the outer circumference past an end face of said slit, thereby forming a narrow member of the rotor core between said hole and the outer circumference that extends in a radial direction.

2. The motor as defined in claim 1, wherein an angle made by a width of said hole adjacent to said outer circumference with regard to a rotor core center is smaller than another angle made by a longitudinal width of said slit that faces said outer circumference with regard to the rotor core center.

3. The motor as defined in claim 1, wherein a width of said hole along a radius direction is more than twice a width of an air gap between the rotor and a corresponding part of said stator.

4. The motor as defined in claim 1, wherein said permanent magnet is a flat plate.

5. The motor as defined in claim 1, wherein said slit and said hole are arranged to meet a condition as follows:
   an angle encompassing a rotor core portion "θ a" with regard to the rotor center is substantially 120/Nm degree,
   where Nm represents a number of rotor poles, and
   wherein the angle "θ a" is defined as the angle encompassed by an end of a first hole adjoining a first slit and an end of a second hole adjoining a second slit, located adjacent the first slit, that is furthest away from the end of the first hole.

6. The motor as defined in claim 1, wherein said permanent magnet comprises a rare earth magnet.

7. The motor as defined in claim 1, wherein non-magnetic material is provided in said hole.

8. The motor as defined in claim 7, wherein said permanent magnet is molded in a space limited by the non-magnetic material within said slit.

9. The motor as defined in claim 1, wherein the number of rotor poles Nm is equal to four (4).

10. The motor as defined in claim 1, wherein a ratio of a rotor core outer diameter vs. a stator core outer diameter ranges from 0.47 to 0.5.

11. The motor as defined in claim 1, wherein an angle "θ i" satisfies a condition as follows:

$$\text{"}\theta i\text{"} = 360 \cdot i/Nm + 720 \cdot j/(Nt \cdot Nm)$$

where
   "Nt" represents a number of teeth of a stator,
   "Nm" represents a number of rotor poles,
   "j" is an integer which takes 0 when "i" divided by Nm/2 becomes an integer. When "i" divided by Nm/2 becomes an integer, then "j" becomes "0" (zero). When the result does not become an interger, and if each decimal part of "i" divided by Nm/2 are the same, then "j" becomes less than Nm/2 and an identical integer.

12. The motor as defined in claim 11, wherein the number of teeth of the stator is 3 Nm.

13. The motor as defined in claim 1, wherein more than one magnetic locational relation is available between an end of said hole and a tip of a tooth of said stator.

14. The motor as defined in claim 1, wherein said slit is shaped in an arc of which a concave side faces to the rotor outer circumference.

15. The motor as defined in claim 14, wherein said permanent magnet is inserted into said slit shaped in an arc of which a concave side faces to the rotor outer circumference, thereby forming N poles inside the arc shaped permanent magnet facing the center of the rotor and S poles outside the arc shaped permanent magnets facing the outer circumference of the rotor.

16. The motor as defined in claim 1, wherein the hole extends along the outer circumference past an end face of said slit and past a longitudinal face of said slit that faces the outer circumference, wherein the narrow member of the rotor core is disposed between the longitudinal face of said slit and said outer circumference.

17. The motor as defined in claim 1, wherein said slit is arranged in an approximate "V" shape having an open side and a pointed side, wherein the open side faces the outer circumference of the rotor and the pointed side faces the center of the rotor.

18. The motor as defined in claim 17, wherein the hole extends along the outer circumference past an end face of said slit toward the pointed side of the slit.

19. The motor as defined in claim 1, wherein the rotor poles are numbered sequentially from a reference pole clockwise or anti-clockwise direction, such as i=1,2,3,4, , , , , Nm, and at the "i th" pole from the reference pole, an edge width of the hole located at the left end of the pole viewed from outside of the rotor, where the edge is adjacent to the outer circumference of the rotor core, with regard to the rotor core center makes an angle $\delta_{iL}$, and the same angle at the right end of the pole is $\delta_{iR}$, then, there is the following equation between $\delta_{iL}$ and $\delta_{iR}$:

$$\delta_{iL,R} = \delta_{OL,R} + 240 \cdot n \cdot j / Nm^2$$

where,

Nm represents a number of rotor poles,

"n" is fixed as an integer between 1 and Nm/2, (both figures are included)

"j" takes an integer between 0 and (Nm/2n)−1 in "n" times respectively for the cases of "i" being an even number, "i" being an odd number, the left end of rotor pole and the right end of rotor pole.

20. The motor as defined in claim 19, wherein an equation $\delta_{OL,R} = 120 \cdot n / Nm^2$ is satisfied.

21. The motor as defined in claim 19, wherein n=1 is satisfied.

22. The motor as defined in claim 1, wherein a ratio of a number of the stator teeth to a number of the rotor poles is 3:2.

* * * * *